(12) United States Patent
Hiriart (10) Patent No.: US 8,804,956 B2
(45) Date of Patent: Aug. 12, 2014

(54) METHOD AND DEVICE FOR THE PARTIAL ENCRYPTION OF A DIGITAL CONTENT

(75) Inventor: Laurent Hiriart, Paris (FR)

(73) Assignee: Mobiclip, Paris (FR)

( * ) Notice: Subject to any disclaimer, the term of this patent is extended or adjusted under 35 U.S.C. 154(b) by 496 days.

(21) Appl. No.: 12/673,610

(22) PCT Filed: Aug. 12, 2008

(86) PCT No.: PCT/EP2008/060594
§ 371 (c)(1),
(2), (4) Date: Nov. 5, 2010

(87) PCT Pub. No.: WO2009/021953
PCT Pub. Date: Feb. 19, 2009

(65) Prior Publication Data
US 2011/0044452 A1     Feb. 24, 2011

(30) Foreign Application Priority Data

Aug. 13, 2007  (FR) ..................... 07/05838

(51) Int. Cl.
*G06F 21/00*   (2013.01)
*H04N 21/2347* (2011.01)
*H04N 21/266*  (2011.01)
*H04N 21/4405* (2011.01)

(52) U.S. Cl.
CPC ... *H04N 21/23476* (2013.01); *H04N 21/26613* (2013.01); *H04N 21/44055* (2013.01)
USPC ......................................... 380/200; 380/201

(58) Field of Classification Search
CPC .................. H04N 21/23476; H04N 21/26613; H04N 21/44055
USPC ................................................ 380/200–201
See application file for complete search history.

(56) References Cited

U.S. PATENT DOCUMENTS

| | | | | |
|---|---|---|---|---|
| 5,889,860 A * | 3/1999 | Eller et al. | ....................... | 705/51 |
| 5,995,623 A * | 11/1999 | Kawano et al. | ............... | 713/189 |
| 7,278,031 B1 * | 10/2007 | Best | ............................. | 713/193 |
| 8,098,817 B2 * | 1/2012 | Aslam et al. | .................... | 380/37 |
| 2002/0044657 A1 * | 4/2002 | Asano et al. | ................... | 380/201 |
| 2002/0169971 A1 * | 11/2002 | Asano et al. | ................... | 713/193 |
| 2003/0026423 A1 * | 2/2003 | Unger et al. | .................. | 380/217 |
| 2003/0138102 A1 * | 7/2003 | Kohn et al. | ................... | 380/213 |
| 2004/0123094 A1 * | 6/2004 | Sprunk | ......................... | 713/150 |
| 2005/0028192 A1 * | 2/2005 | Hooper et al. | .................. | 725/31 |
| 2005/0060266 A1 * | 3/2005 | DeMello et al. | ................ | 705/57 |
| 2005/0123136 A1 * | 6/2005 | Shin et al. | ..................... | 380/217 |
| 2006/0002552 A1 | 1/2006 | LeComet et al. | | |
| 2007/0177718 A1 * | 8/2007 | Shimosato et al. | ............. | 380/28 |
| 2007/0198858 A1 * | 8/2007 | Kim et al. | ..................... | 713/193 |

OTHER PUBLICATIONS

International Search Report for PCT/EP2008/060594, mailed Nov. 13, 2008.

(Continued)

*Primary Examiner* — Chau Le
(74) *Attorney, Agent, or Firm* — Nixon & Vanderhye, P.C.

(57) ABSTRACT

The present invention concerns a method of enciphering the digital content intended to be deciphered and retrieved on mobile terminals which makes it possible to limit the computing power necessary for the deciphering and therefore the energy used to do this. The broadcast content is partially enciphered. A signature of the headers of the pictures ensures the integrity of the data.

20 Claims, 6 Drawing Sheets

(56) References Cited

OTHER PUBLICATIONS

Foreign-language Written Opinion of the International Searching Authority for PCT/EP2008/060594, mailed Nov. 13, 2008.

Liu, X. et al., "Selective Encryption of Multimedia Content in Distribution Networks: Challenges and New Directions", Proceedings of the Iasted Int'l. Conf. Comm., Internet and Information Technology, (2003), pp. 527-533.

Kunder, D. et al., "Video Fingerprinting and Encryption Principles for Digital Rights Management", Proceedings of the IEEE, vol. 92, No. 6, (Jun. 2004), pp. 918-932.

Van Moffaert, A. et al., "Digital Right Management: DRM is a key enabler for the future growth of the broadband access market, and the telecom/networking market in general", Alcatel Telecommunications Review, (Apr. 2003), 9 pages.

Kaplan, M. et al., "IBM Cryptolopes, SuperDistribution and Digital Rights Management", Internet Citation, [Online], (Dec. 30, 1996), 8 pages.

International Preliminary Examination Report with English translation, relating to PCT/EP2008/060594; and mailed on Apr. 15, 2010.

\* cited by examiner

METHOD AND DEVICE FOR THE PARTIAL ENCRYPTION OF A DIGITAL CONTENT

This application is the U.S. national phase of International Application No. PCT/EP2008/060594, filed 12 Aug. 2008, which designated the U.S. and claims priority to France application Ser. No. 07/05838 filed 13 Aug. 2007, the entire contents of each of which are hereby incorporated by reference.

The present invention concerns a method of enciphering digital content intended to be deciphered and retrieved on mobile terminals.

Systems for distributing digital contents on demand must deal with several constraints. A first constraint relates to the bandwidth necessary for distribution. This constraint is all the greater, the larger the user base and the greater the amount of digital content to be distributed. It is therefore particularly strong in the case of the distribution of video content intended for the general public. Another constraint is the management of digital rights and the techniques used for combating the illegal use of the content thus distributed. Moreover, when these digital contents are intended for mobile terminals, it is advantageous for the computing power necessary for the deciphering of these contents to be as limited as possible. This is because these terminals generally have a limited computing power. In addition, some terminals generally function by means of a limited energy source and therefore the less the deciphering consumes energy, the longer the energy of the terminal lasts.

The present invention aims to resolve the above constraints by means of a method of enciphering digital contents making it possible to limit the computing power necessary for deciphering and therefore the energy used to do this. The content distributed is enciphered partially. A signature of the headers of the picture ensures the integrity of the data.

The solution proposed makes it possible to implement firstly an effective distribution of the data alleviating the deciphering process without compromising the protection of the content against fraudulent usages.

The invention concerns a method of enciphering a digital content divided into retrievable units called pictures, each picture comprising a header and a content, which comprises a step of partial enciphering of the content by means of a symmetrical key.

According to a particular embodiment of the invention, the same proportion of the content of each picture is enciphered.

According to a particular embodiment of the invention, the pictures being of several types, only the content of the pictures of a given type is enciphered at least partially.

According to a particular embodiment of the invention, the content of each picture being compressed, the various types of picture being defined by the picture compression mode, a first type of picture being compressed intrinsically, the other type or types of picture being compressed using at least some pictures of the first type, only the content of the pictures of the first type is enciphered at least partially.

According to a particular embodiment of the invention, a checksum is calculated on the contents at least of the pictures the content of which is enciphered at least partially, this checksum being signed by means of a key and introduced into the header of said pictures.

According to a particular embodiment of the invention, the proportion of content enciphered is stored in the header of the pictures enciphered at least partially.

The invention also concerns a digital content divided into retrievable units called pictures, each picture comprising a header and a content, characterised in that it is enciphered according to one of the above methods.

The invention also concerns a method of deciphering a digital content enciphered according to one of the above methods.

The invention also concerns a terminal for retrieving a digital content, characterised in that it comprises means of deciphering a digital content enciphered according to one of the above methods.

The invention also concerns a device that comprises means of enciphering a digital content according to one of the above methods.

The features of the invention mentioned above, as well as others, will emerge more clearly from a reading of the following description of an example embodiment, said description being given in relation to the accompanying drawings, among which.

The invention concerns a system for distributing digital contents on demand. In such a system, a user provided with a retrievable terminal for the service and means of connection to a communication network can navigate within a service offer. He can choose one of them, purchase it on line, download it and then consult it by means of his terminal. Such offers are on the increase, whether in the field of music with audio services or in the video field with offers of films or any other multimedia service. These systems are confronted with two main constraints. The first, in particular in the field of video, concerns the technique for distributing the content. This is because the quantity of data to be distributed is great, in particular for a complete film. These data are distributed at the request of the users, which makes any common distribution between the various users difficult. Distribution therefore requires large capacities for sending data and a distribution system with a large bandwidth in order to be able to distribute content dedicated to a large number of users. The second constraint relates to the checking of the uses made of the content. The distributors wish to guarantee their rights and prevent illegal copying of the contents offered. To do this, systems for managing digital rights, referred to as DRM (digital rights management) are used. These systems are generally based on the enciphering of the content and the distribution of deciphering keys to authorised users.

Figure 1:
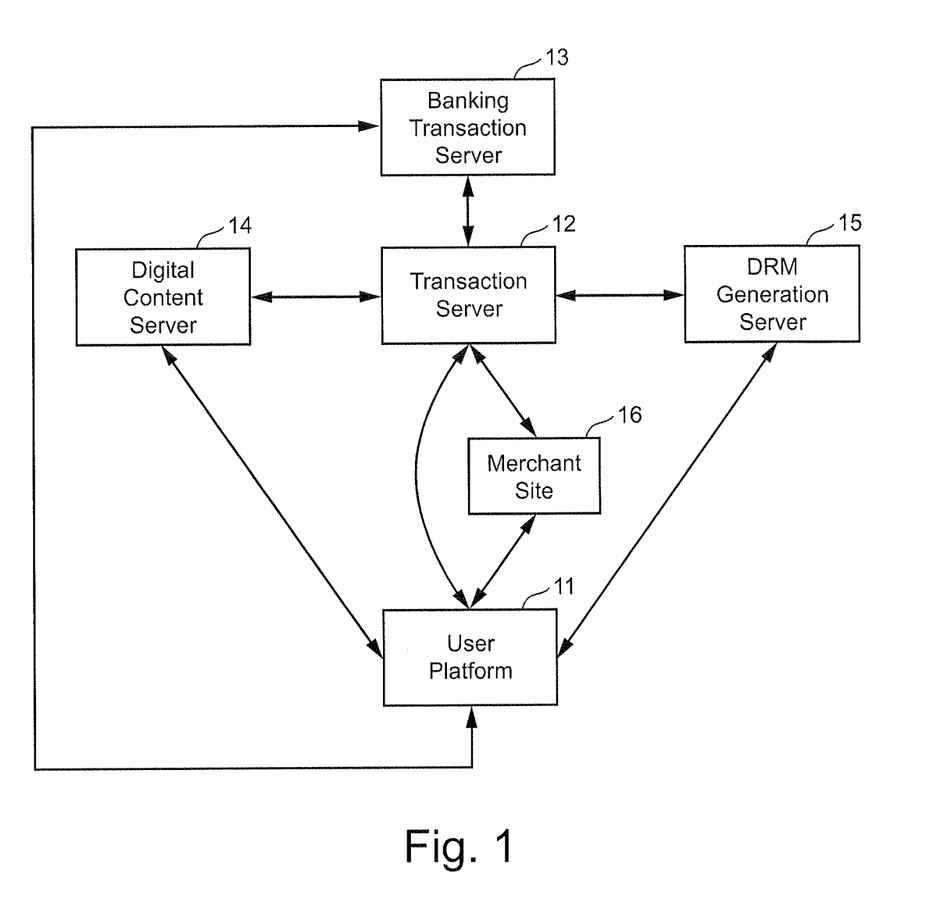
FIG. 1 illustrates the general architecture of the embodiment of the invention

FIG. 1 illustrates the general architecture of the embodiment of the invention. A user platform, referenced 11, is provided with means of retrieving the services distributed and means of connection to a data communication network, for example the Internet. The user platform 11 communicates with a merchant site 16 in order to choose the content the rights of which he wishes to acquire. This merchant site may be a service offered by the mobile telephony operator and hosted by the latter in the case where the terminal is a mobile telephone.

The platform is connected to a digital content server referenced 14 that hosts and broadcasts the contents that can be retrieved by the user platform 11. The user platform is also connected to a banking transaction server 13 for making payments for the purchase of rights over the digital contents. The user platform 11 is also connected to a DRM generation server 15 for generating and distributing DRM files. A transaction server 12 is connected to these various players, the user platform 11, banking transaction server 13, content server 14 and DRM server 15. This transaction server makes it possible to store the transactions, to make a link between the various players during the various steps proceeding with the acquisition of a digital content and corresponding rights. In addition, it enables the user to reload the content or rights in the event of loss of data.

Figure 2:
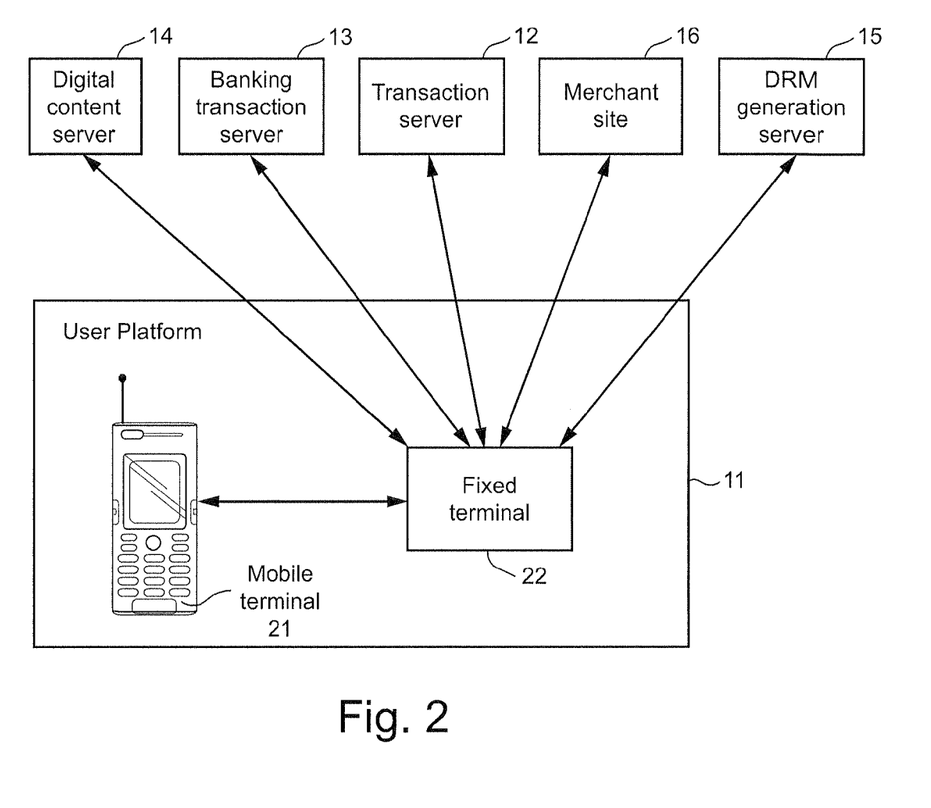
FIG. 2 illustrates a possible architecture of the user platform in a first embodiment of the invention.

The example embodiment of the invention is situated more particularly in the context of the distribution of content intended for mobile terminals such as for example mobile telephones, but it can also be implemented in the context of fixed terminals. FIG. 2 illustrates a possible architecture of the user platform in a first embodiment of the invention. In this embodiment, the user has a fixed terminal 22 at his home, for example a personal computer connected to a communication network such as the Internet, a router modem for access to the Internet or a digital television decoder (set top box). The mobile terminal 21 for which the digital content is intended is connected to the fixed terminal 22. The user uses the fixed terminal for interacting with the various servers in the system. The digital content is downloaded by the fixed terminal, as well as the corresponding rights, before it is copied onto the mobile terminal 21. Once the content and the rights are copied onto the mobile terminal 21, the content can be consulted autonomously on the mobile terminal without requiring a connection either with the fixed terminal 22 or with the servers of the system 12, 13, 14, 15 and 16.

In an alternative embodiment of the invention, the mobile terminal itself has the means of access to the communication network and directly manages the interactions with the various servers of the system without requiring connection to a fixed terminal. It is also possible, in this case, to use telephone payment methods, for example using surcharged numbers or short messages.

In this method, the connection can be made via the data channel of the telephone link, typically for terminals implementing the third-generation communication standards such as UMTS (universal mobile telecommunication system) or (E)GPRS ((enhanced) general packet radio service). The connection can also be made via communication means independent of the telephone connection, for example using protocol family 802.11, a technique known as WiFi. It goes without saying that any communication technique can be used in this case between the terminal and the servers in so far as it is compatible with the downloading of large quantities of data.

Figure 3:
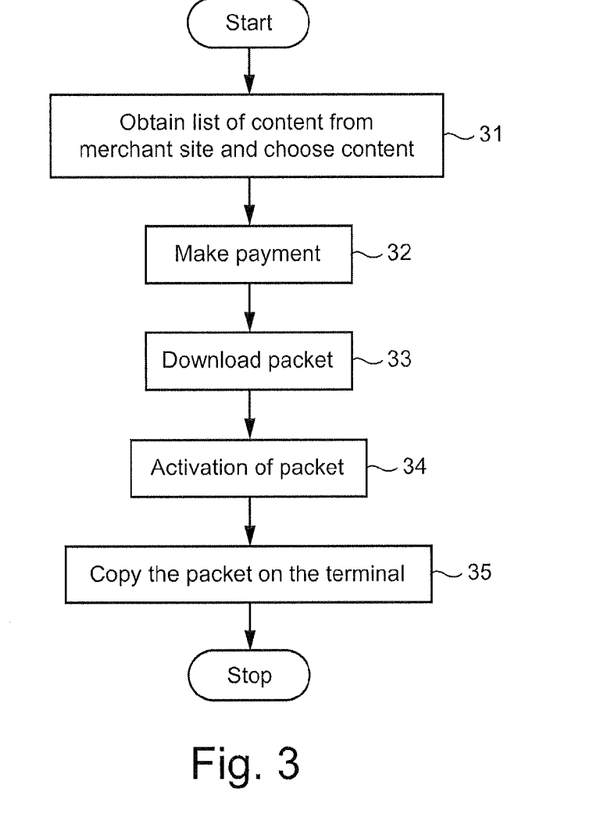
FIG. 3 shows the general process of acquiring the digital content and the related rights.

The general process of acquiring the digital content and related rights will now be described with reference to FIG. 3. During a first step 31, the user connects to the merchant site 16. On this site, he can obtain a list of contents available and choose the one that he wishes. Once the content is chosen, the user makes the payment corresponding to his purchase during a step 32. During this step, the user is automatically connected to the banking transaction server, which requests of him his banking details in order to be able to make a request for authorisation to the bank of the user. The data required are generally the card number, the expiry date and the visual cryptogram. As soon as the authorisation response is received, the banking transaction server simultaneously sends a response to the merchant server as well as a voucher to the user. This step is conventional and functions in the same way as for any merchant site accessible on line by means of a communication network. All known implementation modes, such as the so-called one click option allowing purchase without providing bank details by virtue of a storage of these on, for example, the transaction server, can be used here.

Once the purchase is validated, the user receives a reference of a content to be downloaded. This reference may for example be a URL (universal resource locater) allowing downloading of said content according to the HTTP protocol. Obviously any other reference mode and downloading protocol, for example the file transfer protocol FTP, can also be used. The content is downloaded in the form of a packet during a step 33.

This packet is a set of data comprising the content and information useful for the subsequent activation phase, step 34. The packet thus downloaded is generic in that the same packet will be downloaded by all the users purchasing this content, at least all the users purchasing content and having available the same model, or category of model, of retrievable terminal. The packet is therefore generic in that it is not personalised according to the user who made the purchase. This characteristic makes it possible to implement a simple content distribution platform not requiring any processing of the content prior to the distribution according to the identity of the user who purchased rights relating to this content. Preferentially, the content of this packet is encoded in order to prevent use thereof while omitting the activation phase 34. The user therefore downloads a generic version of the content that is not directly usable as it stands with a view to retrieval thereof.

The packet activation phase will consist of downloading rights relating to the content included in the packet, to the transaction made and to the identity of the owner of these rights. More exactly, the rights acquired by the user relate to the identity of the mobile terminal that is the destination of the content. The activation procedure will be detailed below. Once these rights are obtained, the content and the rights will be copied during a step 34 onto the destination mobile terminal. The content will then be freely usable on this terminal in the context of the rights acquired. Retrieval of the content does not then require connection to the communication network in order to function.

Figure 4:
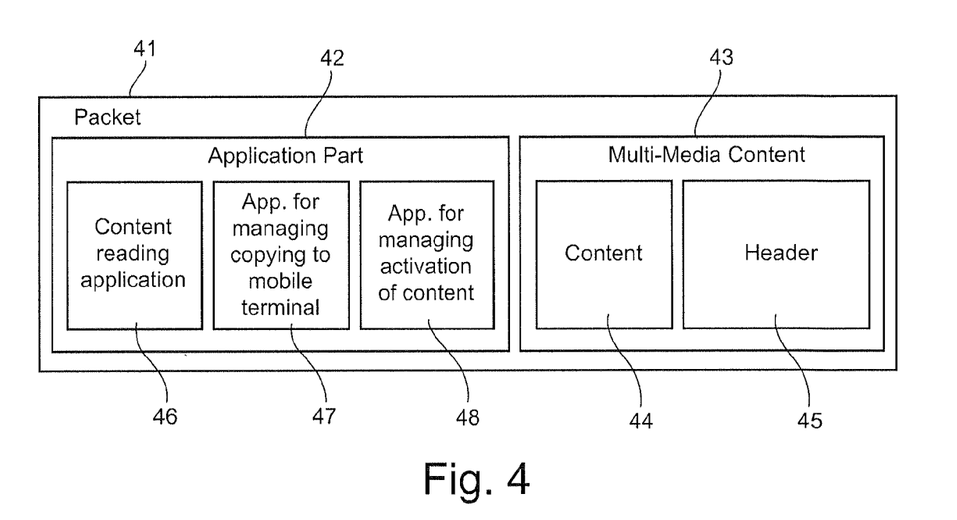
FIG. 4 illustrates the architecture of the downloaded package in one embodiment of the invention.

The architecture of the packet downloaded in a first embodiment is illustrated in FIG. 4. This architecture corresponds to an example in the case where the user platform consists of a mobile retrieval terminal connected to a first terminal, itself connected to the communication network. The packet referenced 41 comprises the multimedia content 43, itself comprising the content proper 45 and a header referenced 44. The packet 41 also comprises an application part 42 comprising the content reading application 46, an application 47 for managing the copying between the fixed terminal and the mobile terminal and an application 48 for managing the activation of the content. Alternatively, the application 47 for managing the copying and the application 48 for managing the application of the content may be parameters intended for a resident application. This package is specific for a type of mobile retrieval terminal.

In particular, the content is adapted to certain technical specificities of the terminal such as the resolution, the type of processor, the quantity of memory or the computing power. Likewise, the packet comprising the content-reading software, this software is designed for the type of terminal on which it is required to be executed. In this embodiment of the invention, the content server has one packet copy per content and per type of mobile terminal compatible with the system. On the other hand, the packet is not specific to the user, to the purchasing transaction or to the particular mobile terminal used for retrieval. In this regard, the packet is said to be generic, the same packet being distributed to all the users purchasing the same content intended for the same type of mobile terminal. A type of mobile terminal is defined as one or more mobile terminal models having common technical features including the type of processor and the screen resolution.

In a second embodiment of the invention, the mobile terminal being connected directly to the various servers without passing through a fixed terminal, the packet contains a module for verifying the type of mobile terminal instead of the module for managing the copying between the fixed terminal and the mobile terminal.

Figure 5:
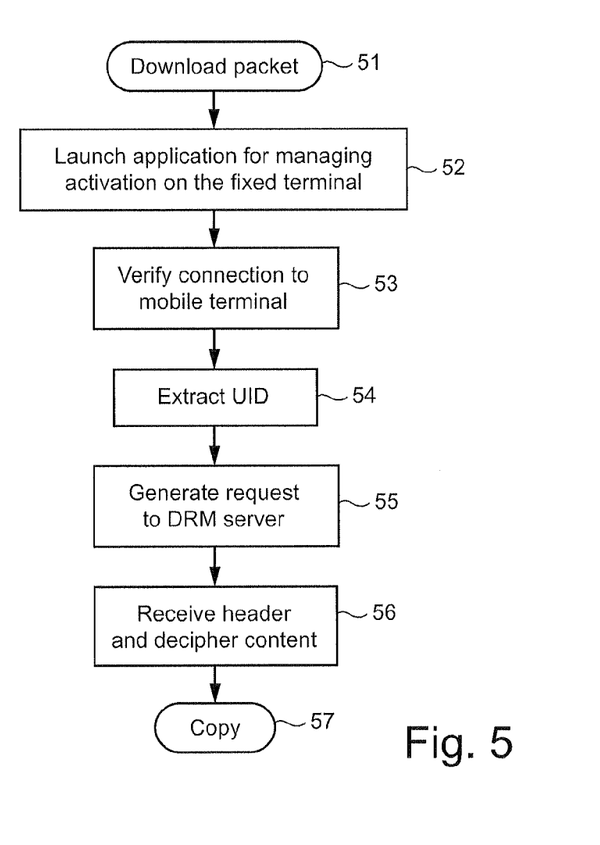
FIG. 5 illustrates the activation procedure according to an example embodiment of the invention.

FIG. 5 illustrates the activation procedure according to an example embodiment of the invention. During a first step 51, the packet is downloaded onto the fixed terminal. Next, during a step 52, the application managing the activation of the content integrated in the packet is then launched with the parameters integrated in the packet. This application checks, during a step 53, that the destination mobile terminal for the content is indeed connected to the fixed terminal. It then extracts from the mobile terminal a unique identifier, called UID (unique identifier). This identifier is, for example, the IMEI (international mobile equipment identity) identifier for the terminal in the case of a telephony terminal. Alternatively, when the content is intended to be saved on a memory card, the UID may be the hardware identifier of said card, referred to as CID (card identifier). In this case, the activation management application checks that said card is present within the mobile terminal, and then extracts the CID and stores it in the form of a file on the card during a step 54. If the card is not present in the mobile terminal, the application requests the user to insert the card into the apparatus. According to the UID chosen, IMEI or CID, the content will be connected either to the terminal or to the card.

Once in possession of the UID and the content identifier present in the packet, the application managing the activation is in a position to generate a request to the DRM server, step 55, in order to obtain a header for deciphering the content. The request must also identify the user so as to allow verification of the banking transaction by the DRM server with the transaction server. Several solutions can be used here to obtain the user identifier. A first solution consists of once again requesting the user to enter his personal information, for example a name and a password. Another solution consists of storing this information, or a reference to this information, between the steps of managing the banking transaction, the steps of downloading the packet and the activation steps. This storage can take place in several ways and may consist of storing a server registration (cookie) within the browser when the HTTP (HyperText Transfer Protocol) protocol is used for exchanges between the management application and the server. Another possibility of automatic transmission of the identification of the user between the transaction server and the DRM server may, for the transaction server, consist of storing the IP address of the user. The DRM server then uses the source IP address of the activation request as the user identifier with the transaction server. The constraint is here that this process fails in the case of a new attribution of IP address to the fixed terminal, for example if the activation takes place during a new session of connection of this fixed terminal to the communication network. Moreover, several users connected to the same gateway may be seen by the servers as having the same IP address. A user identifier may also be added to the name of the downloaded packet. This addition is then preferably made on the fixed terminal serving for management of the banking transaction and the downloading of the packet rather than on the server so as not to overload the latter by imposing a processing on it. In this way, there is no break with the generic character of the packet allowing effective decentralised management of the distribution of said packets. In this case, the activation management application recovers this identifier in the name of the packet during the preparation of the request to the DRM server. Finally, this request comprises at least the user identifier, the content identifier and the UID of the retrieval platform, the terminal or the card according to the option chosen.

In response, the activation management application receives from the DRM server a header containing the information enabling the content-reading application to decipher the data thereof during a step 56. This header contains, among other things, the UID of the retrieval platform from which the transaction was made which is confronted with the actual UID of the platform by the reading application in order to authorise this only when these two identifiers correspond. Information relating to any validity duration is also preferentially present in this header. It makes it possible to limit in time the rights of access to the content. Content acquisition mechanisms can thus be set up in a form of hiring. The header also contains an identifier of the AES symmetrical key that was used for encoding the content. The header sent is protected by a checksum, for example an SHA1 cryptographic hash function (secure hash algorithm), this checksum being signed by means of the private key of the supplier. The content-reading application therefore finds in this header the identifier of the AES (advanced encryption standard) symmetrical key for deciphering the contents, the identifier of the terminal for which the packet is authorised and preferably the validity dates. It is therefore in a position to test whether the terminal on which it is executed is indeed the authorised terminal as well as whether this is indeed the period for which the rights have been acquired and thus to authorise or not the reading of the content. The packet is then copied onto the mobile terminal during a step 57.

Figure 6:
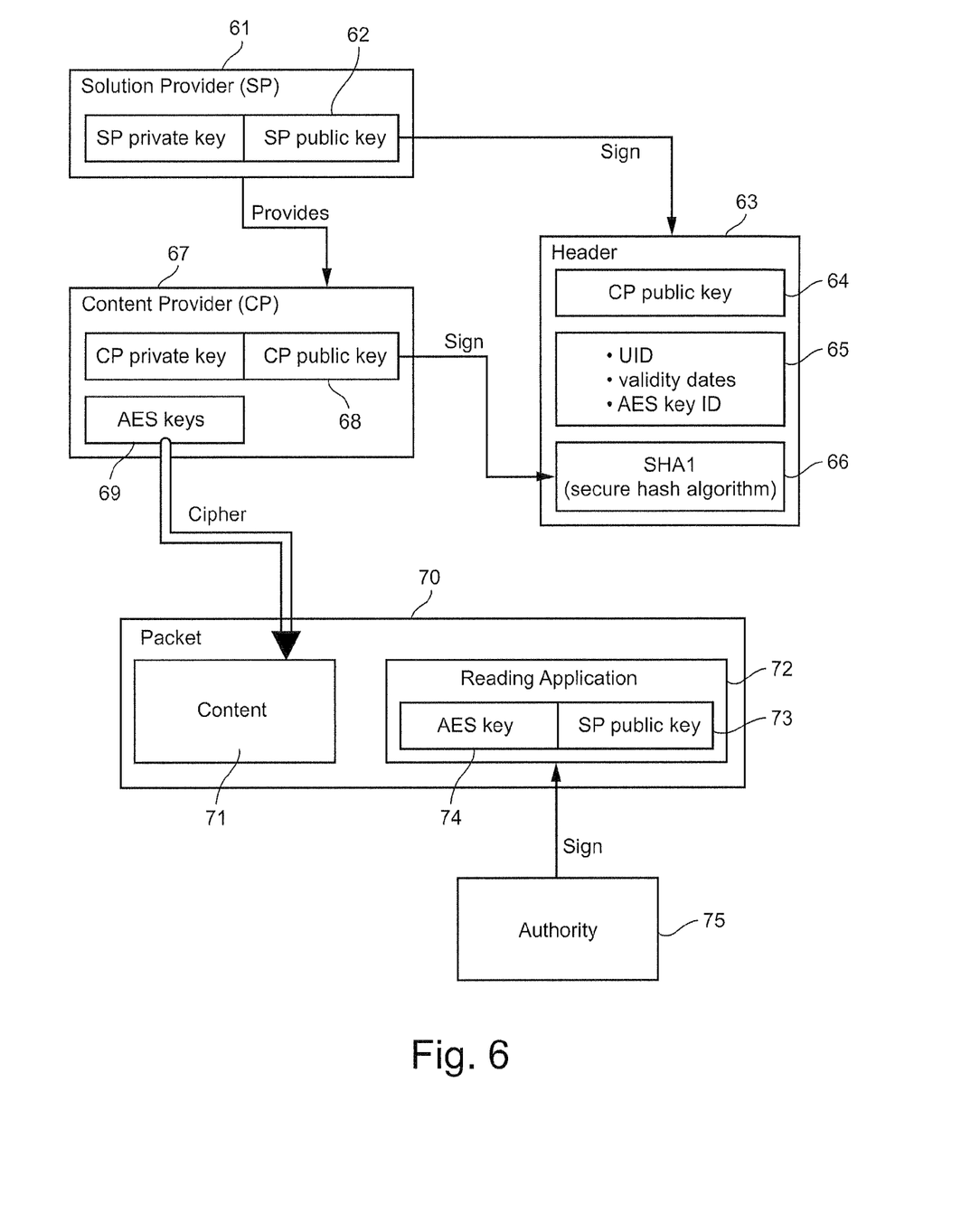
FIG. 6 illustrates the enciphering diagram.

The enciphering scheme is described in FIG. 6. The solution provider referenced 61 provides the broadcast solution to the operator managing the broadcast platform. This solution provider 61 has a private key and master public key pair referenced 62. The content provider 67, which may or may not be the operator, obtains from the solution provider a private key and public key pair 68. It also obtains a version signed by the master key of the solution provider 62 of his own public key. The provider also manages the keys, allowing the symmetrical enciphering of the content, referenced 69, for example AES keys. The content provider generates the packets comprising firstly the enciphered digital content 71 by means of one of the keys 69. Secondly, the packet also comprises the reading application 72 adapted to the type of mobile terminal intended to receive the packet.

This reading application contains a set 74 of keys able to be used by the content provider for enciphering the content. Alternatively, this set will be stored in a deposit on the terminal. In this case, the keys will be able to be downloaded in advance or according to requirements by the reading application according to a key loading protocol, for example the Diffie-Hellman protocol. The keys can also be introduced into the protected memory of the apparatus when the latter is manufactured. The reading application also concerns the master public key 73 of the solution provider 61. The integrity of the reading application is guaranteed by the certification mechanism of the operating system of the mobile terminal. This is because the majority of operating systems make it possible to allow the launch on the apparatus only of applications signed by means of a specific certificate following a certification process guaranteeing the conformity of the application. This certification is carried out by an authority 75 generally under the control of the terminal manufacturer.

Figure 7:
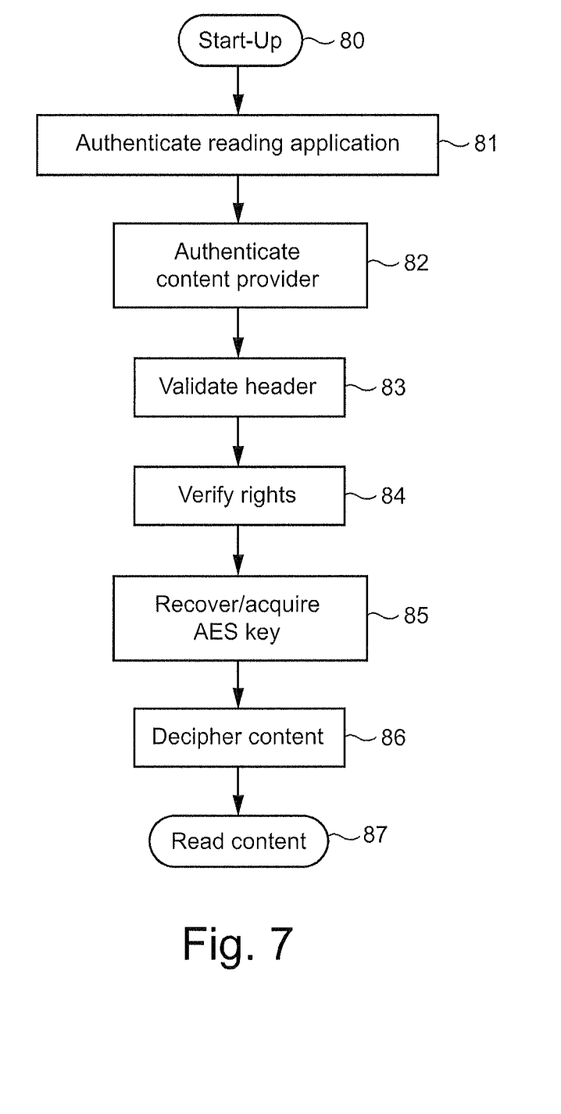
FIG. 7 illustrates the process of verifying the reading application.

In order to be able to retrieve the content, the reading application makes a certain number of checks before accepting this retrieval. The process is illustrated by FIG. 7. During a step 80, the user requests the start-up of the reading application. To effect this start-up, the operating system of the mobile terminal authenticates the reading application, which guarantees its integrity, during step 81. Next, during a step 82, the reading application authenticates the validity of the public key of the content provider by means of the master public key of the solution provider. It can therefore, using this certified public key of the solution provider, validate the checksum of the header and therefore the integrity of the header during a step 83. The data of the header being validated, it is in a position to verify the content reading rights during step 84. This verification comprises the verification of the match between the UID contained in the header and that of the terminal or card. Preferentially, it also checks the validity data contained in the header. Once these validations are made, it determines the key that was used for the enciphering of the content, a reference of which is present in the header. It finds this key either in the list of keys that it possesses or in a register on the telephone. Alternatively, it can also request it in the form of a request via a key-downloading protocol. This is step 85. Once in possession of the key, it can decipher the content during a step 86 and finally read this content during a step 87.

The computing power of the mobile terminals being limited, it is advantageous to offer content-enciphering schemes that allow deciphering not requiring great computing power. However, security constraints impose a scheme that is all the same robust for limiting the possibilities of fraudulent deciphering. The video content is composed of a succession of pictures. These pictures are generally compressed according to a scheme in the MPEG (Moving Picture Experts Group) family of standards. These schemes have in common the principle of dividing the succession of pictures in a group, or GOP (group of pictures). These groups commence with a picture of type I (standing for intra coded picture), which is a reference picture compressed intrinsically. That is to say the decompression of such a picture depends only on the data of the picture itself. Pictures of type P (predictive coded pictures) follow. These pictures are compressed from information on the previous type I or P pictures. In fact, only the differences between these pictures and the previous I or P picture are compressed. The group can then contain pictures of type B (bidirectionally predictive coded pictures), which are compressed from the previous and following pictures. During decompression, it is therefore necessary to commence by decompressing a type I picture before being able to decompress the following pictures of the group of type P. The following type I picture is also essential for decompressing the type B pictures. Without the information on the type I pictures, the type P or B pictures cannot be decompressed. Hereinafter, the term picture is used in more general terms to represent the content retrieval unit, whatever the type of content. In particular, the picture contains not only the video picture but also the audio content associated with the video picture. The term picture will also be used for the non-video content such as the purely audio or other content.

Figure 8:
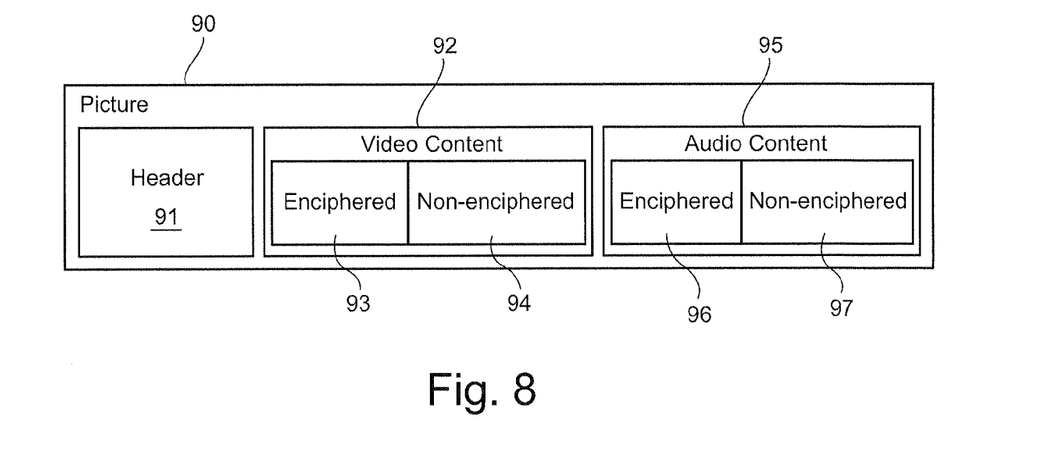
FIG. 8 illustrates the picture enciphering diagram according to one embodiment of the invention.

FIG. 8 illustrates the enciphering scheme for a picture according to one embodiment of the invention. The picture, referenced 90, is composed of a header 91 and a video data part 92 as well as an audio part 95. The header 91 contains, among other things, a sequence number for the picture, making it possible to check that the pictures are indeed all those of the original content in sequence. Advantageously, the header also contains the content identifier. This header has a checksum for the complete picture, for example of the SHA1 type, signed by the access provider key. By virtue of this signature the integrity of the picture is guaranteed.

Any manipulation of the content aimed at changing the order of the pictures or inserting sequences external to the original content is thus guarded against. The content-reading application checks the signature and the integrity of each picture during retrieval. According to a variant embodiment, this check is made randomly on certain pictures only in order to alleviate the retrieval process. According to another variant embodiment of the invention, only type I pictures have this signed checksum.

So as to reduce the computing power necessary for the deciphering of the content, only a portion, tinted in FIG. 8, of the content is enciphered. The video content 92 therefore comprises a first enciphered part 93 and a second non-enciphered part 94. Likewise, the audio content 95 of the picture 90 comprises a first enciphered part 96 and a second non-enciphered part 97. The enciphering is carried out by means of the symmetrical key 74 of FIG. 6. Advantageously, the proportion of enciphered content is stored in the header of the picture. This proportion may vary according to the computing capacity of the destination platform intended for reading the content. According to a variant implementation, only the type I pictures will be partially enciphered. Advantageously, the at least partial enciphering of the content of the pictures is associated with the storage of a checksum signed by an asymmetric key in the header of the image as described in the previous paragraph. By virtue of this method, the computing power necessary for the deciphering of the content during reading is decreased while guaranteeing that the non-enciphered content is not usable in the enciphered part.

The invention claimed is:

1. A method implemented using an information processing apparatus having one or more processors for enciphering a digital video content divided into a plurality of packets each having one or more discrete picture units, each picture unit comprising a video information content data part, the method comprising:

using the one or more processors to provide the video information content data part of at least some picture units as two parts, a first video information data part enciphered by a symmetrical key and a second non-enciphered video information data part, the size of the first enciphered video information data part constituting a predetermined portion being less than an entirety of all video information data comprising a picture unit, wherein the video information content data part of said at least some picture units is only partially enciphered.

2. The enciphering method according to claim 1, wherein said predetermined portion is the same for each of said at least some picture units containing an enciphered video information data part.

3. The enciphering method according to claim 1, wherein picture units may comprise video frames of several types, and only the video information content data part of a picture unit that contains video frames of a predetermined type is enciphered.

4. The enciphering method according to claim 3, wherein the video information content data part of each picture unit that contains video frames of a predetermined type is partially compressed, the predetermined types being defined according to a type of picture compression mode, a first type being compressed intrinsically and other types being compressed using video frame information derived from the first type, wherein only a portion of the video information content data part of a picture unit that contains video frames of the first type is enciphered.

5. The enciphering method according to claim 1, wherein a checksum is calculated on at least the enciphered video information data part of said picture units, the checksum being signed by a key and introduced into the header of said pictures.

6. A method of deciphering enciphered digital video information content wherein an information processing system having one or more computer processors is configured to perform operations comprising:
    performing computations for deciphering an enciphered video information data part of a picture unit contained within a received data packet, the picture unit containing enciphered and non-enciphered video information data parts according to the method of claim 1.

7. The method of enciphering digital content according to claim 1 wherein a picture unit includes a header portion which includes a value specifying a picture sequence number representing a sequential order of picture units.

8. A method of enciphering digital content according to claim 1 wherein a picture unit includes a header portion and the method further comprises storing a value in the header that is indicative of said predetermined proportion of video information content data which consists of the first video data part.

9. A computer implemented method of enciphering digital multimedia content divided into a plurality of packets each having one or more discrete picture units, each picture unit comprising multimedia information content data, the method comprising:
    using one or more computer processors for dividing the multimedia data part of each picture unit into an audio information content portion and a video information content portion, at least one information content portion comprising an enciphered portion and a non-enciphered portion, the enciphered portion being enciphered by said one or more computer processors and being of a size constituting a predetermined proportion but being less than an entirety of an information content portion, wherein said information content portion is only partially enciphered by said one or more computer processors.

10. A method of enciphering digital content according to claim 9 wherein the enciphered portion is enciphered using a symmetrical key.

11. The method of enciphering digital content according to claim 9 wherein a picture unit includes a header portion which includes a checksum.

12. A system for distributing digital content including a user platform for deciphering enciphered multimedia digital content, comprising:
    a computer terminal connected to a communications network and configured for deciphering multimedia digital content which has been previously configured into packets each comprising one or more discrete picture units of digital multimedia content which include at least a video content data part, wherein the video content data part of each picture unit has two parts, a first enciphered part and a second non-enciphered part, the size of the first enciphered part constituting a predetermined portion being less than an entirety of the video content data part, wherein the video content data part of a picture unit is only partially enciphered.

13. A system as set forth in claim 12, comprising:
    a non-mobile computer terminal and a user platform mobile terminal capable of receiving digital content from the non-mobile computer terminal, wherein the non-mobile computer terminal is configured to negotiate digital multi-media content rights with merchant vendors of digital content, and is further configured to retrieve the digital content via the communications network and to decipher the retrieved digital content, and wherein the non-mobile computer terminal is further configured to send digital content to the mobile terminal.

14. The user platform for deciphering enciphered digital content according to claim 12 wherein said first enciphered part is enciphered using a symmetrical key.

15. A device for enciphering a digital content, comprising:
    a server computer using one or more processors connected to a communications network and configured for enciphering portions of said digital content, the server configured to divide said digital content into packets each having one or more discrete picture units, each picture unit of which comprise at least a header and an associated video information content data part, wherein the video information content data part is separated into two parts, a first part enciphered by the server and a second non-enciphered part, the size of the first enciphered part constituting a predetermined portion being less than an entirety of the video information content data part comprising a picture unit, and wherein a value indicative of an enciphered video data proportion of the video information content data part is included in the header.

16. The device for enciphering digital content according to claim 15 wherein said first enciphered part is enciphered using a symmetrical key.

17. A method of enciphering and providing on-demand digital content to a user platform, comprising:
    obtaining particular digital multi-media content specified by a user platform;
    dividing the digital multi-media content into a plurality of packets having one or more discrete picture unit portions each comprising an associated audio/video digital content data part, and enciphering one or more sub-portion of the associated audio/video digital content data part, wherein only a predetermined proportion being less than an entirety of the associated audio/video digital content data part is enciphered;
    assembling one or more packets for providing to a user platform, wherein at least one packet comprises an application part and a multi-media content part, the application part including at least an application program executable on said user platform for obtaining at least encryption key identifying information usable for deciphering said one or more sub-portions; and
    providing said one or more packets to the user platform.

18. A communications network system arrangement for providing on-demand digital content to a user platform, comprising:
    a network digital content server computer configured to divide digital multi-media content into a plurality of packets having one or more discrete picture unit portions each comprising an associated audio/video digital content data part, and to encipher one or more sub-portion of the associated audio/video digital content data part, wherein the associated audio/video digital content data part is only partially enciphered by having a predetermined proportion being less than an entirety of the associated audio/video digital content data part enciphered, the content server being further configured to assemble one or more packets for providing to a user platform, wherein at least one packet comprises an application part and a multi-media content part, the application part including at least an application program that is executable on said user platform for communicating with a network digital rights management server for obtaining at least encryption key identifying information usable for deciphering said one or more sub-portions, and the content server being further configured to provide said one or more packets to a user platform requesting the digital multi-media content; and a network digital rights management server configured to communicate with a user platform executing the application program, and to verify that the user platform is authorized to use the digital multi-media content, and to provide at least encryption key identifying information to the user platform upon verifying that the user platform is so authorized.

19. A method implemented using an information processing apparatus having one or more processors for enciphering digital content divided into a plurality of packets each having one or more discrete picture units, each picture unit including a header and an associated video information content data part, comprising:

compressing the associated video information content data of each picture unit, the video information content data being of a type defined according to a particular compression type, a first type being made up of video frame data compressed intrinsically, and other types being made up of compressed data derived from said video frame data; and using the one or more processors for dividing the associated video information content data part of picture units of the first type into two portions and enciphering only one portion, the enciphered portion being of a size constituting a proportion less than an entirety of the associated video information content data part, wherein only picture units of the first type contain an enciphered portion.

20. An apparatus for enciphering a digital content for providing to a user platform, comprising:

a server computer connected to a communications network for communicating with a user platform, the server computer configured to divide digital video data content into packets each having one or more discrete picture units each of which comprise a header and an associated video information content data part, the server also configured to compress the associated video information content data of each picture unit, the picture units being of a type defined according to a particular compression type, a first type having video frame data compressed intrinsically, and other types having compressed data derived from video frame data, and wherein the server computer is also configured to further divide the associated video information content data part of a picture unit of the first type into two portions and to encipher only one portion, wherein an enciphered portion constitutes only a particular proportion being less than an entirety of an undivided associated video information content data part and wherein only picture units of the first type contain an enciphered portion.

* * * * *